United States Patent
Cheng et al.

(10) Patent No.: US 11,886,423 B2
(45) Date of Patent: *Jan. 30, 2024

(54) BLOCKCHAIN-BASED RECORDING AND QUERYING OPERATIONS

(71) Applicant: Advanced New Technologies Co., Ltd., Grand Cayman (KY)

(72) Inventors: Long Cheng, Hangzhou (CN); Yanpeng Li, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 154 days.

This patent is subject to a terminal disclaimer.

(21) Appl. No.: 17/460,449

(22) Filed: Aug. 30, 2021

(65) Prior Publication Data
US 2021/0390093 A1    Dec. 16, 2021

Related U.S. Application Data

(63) Continuation of application No. 16/776,272, filed on Jan. 29, 2020, now Pat. No. 11,106,659, which is a
(Continued)

(30) Foreign Application Priority Data

Apr. 28, 2019  (CN) .......................... 201910348198.5

(51) Int. Cl.
*G06F 16/00* (2019.01)
*G06F 16/23* (2019.01)
(Continued)

(52) U.S. Cl.
CPC ...... *G06F 16/2379* (2019.01); *G06F 16/2255* (2019.01); *G06F 16/258* (2019.01); *G06F 16/27* (2019.01)

(58) Field of Classification Search
CPC ............. G06F 16/2379; G06F 16/2255; G06F 16/258; G06F 16/27; H04L 9/50; H04L 9/3239

See application file for complete search history.

(56) References Cited

U.S. PATENT DOCUMENTS

| 2018/0219681 A1* | 8/2018 | Geiman ................ H04L 9/3231 |
| 2019/0220919 A1 | 7/2019 | Martinez et al. |

(Continued)

FOREIGN PATENT DOCUMENTS

| CN | 105471826 | 4/2016 |
| CN | 108234478 | 6/2018 |

(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.
(Continued)

*Primary Examiner* — Paul Kim
(74) *Attorney, Agent, or Firm* — Fish & Richardson P.C.

(57) ABSTRACT

Implementations of this specification provide blockchain-based recording and querying methods and apparatuses. An example method includes operations performed by an access gateway, including receiving, from a first service system, user data including a user identifier of a user; transmitting, to an identifier hash system, a first hash request for the user identifier; receiving, from the identifier hash system, a hash digest of the user identifier; replacing the user identifier in the user data with the hash digest of the user identifier, and packaging the user data into a storage transaction; transmitting, to a blockchain, the storage transaction; receiving, from the blockchain, a result of the storage transaction having been performed by a smart contract published by the first
(Continued)

service system on the blockchain; and providing, to the first service system, the result of the storage transaction.

20 Claims, 10 Drawing Sheets

Related U.S. Application Data continuation of application No. PCT/CN2020/072130, filed on Jan. 15, 2020.

(51) Int. Cl.
    *G06F 16/25*     (2019.01)
    *G06F 16/22*     (2019.01)
    *G06F 16/27*     (2019.01)

(56) References Cited

U.S. PATENT DOCUMENTS

2019/0384932 A1   12/2019   Pratt et al.
2020/0005286 A1*   1/2020   Sewell .............. G06Q 20/0658
2020/0236168 A1   7/2020   Todd

FOREIGN PATENT DOCUMENTS

| | | |
|---|---|---|
| CN | 108364218 | 8/2018 |
| CN | 108647962 | 10/2018 |
| CN | 109005186 | 12/2018 |
| CN | 109064031 | 12/2018 |
| CN | 109118355 | 1/2019 |
| CN | 109146499 | 1/2019 |
| CN | 109325662 | 2/2019 |
| CN | 109409882 | 3/2019 |
| CN | 109615529 | 4/2019 |
| CN | 110135844 | 8/2019 |

OTHER PUBLICATIONS

Nakamoto, "Bitcoin: A Peer-to-Peer Electronic Cash System," www.bitcoin.org, 2005, 9 pages.
PCT International Search Report and Written Opinion in International Application No. PCT/CN2020/072130, dated Apr. 13, 2020, 10 pages (with partial English translation).

\* cited by examiner

BLOCKCHAIN-BASED RECORDING AND QUERYING OPERATIONS

CROSS-REFERENCE TO RELATED APPLICATIONS

This application is a continuation of U.S. patent application Ser. No. 16/776,272, now allowed, filed on Jan. 29, 2020, which is a continuation of PCT Application No. PCT/CN2020/072130, filed on Jan. 15, 2020, which claims priority to Chinese Patent Application No. 201910348198.5, filed on Apr. 28, 2019, and each application is hereby incorporated by reference in its entirety.

TECHNICAL FIELD

Embodiments of the present disclosure relate to the field of blockchain technology, and in particular, to blockchain-based credit recording and querying methods, apparatuses, and an electronic device.

BACKGROUND

Blockchain technology, also known as distributed ledger technology, is an emerging technology in which several computing devices jointly participate in "accounting" and maintain a complete distributed database. Because the blockchain technology has the characteristics of decentralization, openness and transparency, participability of each computing device in database records, and rapid data synchronization between computing devices, the blockchain technology may be widely used in many fields.

SUMMARY

The embodiments of the present disclosure provide blockchain-based credit recording and querying methods, apparatuses, and an electronic device.

According to a first aspect of some embodiments of the present disclosure, there is provided a blockchain-based credit recording method, including: submitting, by a service system, user behavior data to an access gateway, wherein the user behavior data includes a user identifier; transmitting, by the access gateway, a hash request for the user identifier to an identifier hash system; in response to the hash request, performing, by the identifier hash system, a reversible conversion on the user identifier based on a reversible conversion function, and a hash digest calculation on a converted user identifier to generate a hash digest; generating a check code for the hash digest, and returning, to the access gateway, the hash digest to which the check code is added; after the access gateway replaces the user identifier in the user behavior data with the hash digest, packaging the user behavior data into a behavior transaction, and transmitting the behavior transaction to a node device on a blockchain; and in response to the behavior transaction, invoking, by the node device, a credit score calculation logic declared in a smart contract corresponding to the behavior transaction, and storing, in the blockchain, a credit score calculated based on the user behavior data.

According to a second aspect of some embodiments of the present disclosure, there is provided a blockchain-based credit querying method, including: transmitting, by a service system, a user credit querying request to an access gateway, wherein the request includes a user identifier; transmitting, by the access gateway, a hash request for the user identifier to an identifier hash system; in response to the hash request, acquiring, by the identifier hash system, respective hash digests related to the user identifier; packaging, by the access gateway, the respective hash digests into a query transaction, and transmitting the query transaction to a node device on a blockchain; in response to the query transaction, invoking, by the node device, a calculation logic declared in a smart contract corresponding to the respective hash digests in the query transaction, and calculating a sum of weighted credit scores corresponding to the respective hash digests to acquire a total credit score; and returning the total credit score to the access gateway, so that the access gateway returns the total credit score to the service system.

According to a third aspect of some embodiments of the present disclosure, there is provided a blockchain-based credit recording method, the method being applied to an access gateway, and including: acquiring behavior data of a target user submitted by a target service system; and packaging the behavior data into a credential storage transaction and transmitting the credential storage transaction to a node device on a blockchain, so that the node device, in response to the credential storage transaction, invokes a calculation logic declared in a smart contract published by the target service system on the blockchain, calculates a credit score of the target user based on the behavior data, and stores, as a credential, the credit score of the target user under the target service system.

According to a fourth aspect of some embodiments of the present disclosure, there is provided a blockchain-based credit recording method, the method being applied to a node device on a blockchain, and including: receiving, from an access gateway, a credential storage transaction into which behavior data of a target user submitted by a target service system is packaged; and in response to the credential storage transaction, invoking a calculation logic declared in a smart contract published by the target service system on the blockchain, calculating a credit score of the target user based on the behavior data, and storing, as a credential, the credit score of the target user under the target service system.

According to a fifth aspect of some embodiments of the present disclosure, there is provided a blockchain-based credit querying method, the method being applied to an access gateway, and including: receiving a credit score querying request with respect to a target user submitted by a target service system; submitting a query transaction with respect to the target user to a node device on a blockchain, so that the node device, in response to the query transaction, invokes a calculation logic declared in a smart contract published on the blockchain, searches for credit scores of the target user in respective service systems, and calculates a total credit score according to the credit scores of the target user in the respective service systems; and returning, to the target service system, the total credit score of the target user included in a query result returned by the node device.

According to a sixth aspect of some embodiments of the present disclosure, there is provided a blockchain-based credit querying method, the method being applied to a node device on a blockchain, and including: receiving a query transaction with respect to a target user submitted by an access gateway; in response to the query transaction, invoking a calculation logic declared in a smart contract published on the blockchain, searching for credit scores of the target user in respective service systems, and calculating a total credit score according to the credit scores of the target user in the respective service systems; and returning, to a target service system, the total credit score of the target user included in a query result returned by the node device.

According to a seventh aspect of some embodiments of the present disclosure, there is provided a blockchain-based credit recording apparatus, the apparatus being applied to an access gateway, and including: an acquisition unit configured to acquire behavior data of a target user submitted by a target service system; and a recording unit configured to package the behavior data into a credential storage transaction and transmit the credential storage transaction to a node device on a blockchain, so that the node device, in response to the credential storage transaction, invokes a calculation logic declared in a smart contract published by the target service system on the blockchain, calculates a credit score of the target user based on the behavior data, and stores, as a credential, the credit score of the target user under the target service system.

According to an eighth aspect of some embodiments of the present disclosure, there is provided a blockchain-based credit recording apparatus, the apparatus being applied to a node device on a blockchain, and including: a reception unit configured to receive, from an access gateway, a credential storage transaction into which behavior data of a target user submitted by a target service system is packaged; and a recording unit configured to, in response to the credential storage transaction, invoke a calculation logic declared in a smart contract published by the target service system on the blockchain, calculate a credit score of the target user based on the behavior data, and store, as a credential, the credit score of the target user under the target service system.

According to a ninth aspect of some embodiments of the present disclosure, there is provided a blockchain-based credit querying apparatus, the apparatus being applied to an access gateway, and including: a reception unit configured to receive a credit score querying request with respect to a target user submitted by a target service system; a querying unit configured to submit a query transaction with respect to the target user to a node device on a blockchain, so that the node device, in response to the query transaction, invokes a calculation logic declared in a smart contract published on the blockchain, searches for credit scores of the target user in respective service systems, and calculates a total credit score according to the credit scores of the target user in the respective service systems; and a returning unit configured to return, to the target service system, the total credit score of the target user included in a query result returned by the node device.

According to a tenth aspect of some embodiments of the present disclosure, there is provided a blockchain-based credit querying apparatus, the apparatus being applied to a node device on a blockchain, and including: a reception unit configured to receive a query transaction with respect to a target user submitted by an access gateway; a querying unit configured to, in response to the query transaction, invoke a calculation logic declared in a smart contract published on the blockchain, search for credit scores of the target user in respective service systems, and calculate a total credit score according to the credit scores of the target user in the respective service systems; and a returning unit configured to return, to a target service system, the total credit score of the target user included in a query result returned by the node device.

According to an eleventh aspect of some embodiments of the present disclosure, there is provided an electronic device, including: a processor; and a memory for storing processor executable instructions, wherein the processor is configured to implement a blockchain-based credit recording method according to any of the aspects described above.

According to a twelfth aspect of some embodiments of the present disclosure, there is provided an electronic device, including: a processor; and a memory for storing processor executable instructions, wherein the processor is configured to implement a blockchain-based credit querying method according to any of the aspects described above.

The embodiments of the present disclosure provide a blockchain-based credit recording solution. For the credential storage transaction of the target user submitted by the target service system, the node device on the blockchain may invoke the calculation logic declared in the smart contract published by the target service system on the blockchain, calculate the credit score of the target user based on the behavior data, and store, as a credential, the credit score of the target user under the target service system. Correspondingly, in a credit querying solution, for the credit score querying request with respect to the target user submitted by any of service systems, the node device on the blockchain may invoke the calculation logic declared in the smart contract published on the blockchain, search for the credit scores of the target user in the respective service systems, and calculate the total credit score according to the credit scores of the target user in the respective service systems. In this way, based on the characteristics of blockchain that cannot be tampered with and is open and transparent, the credit evaluation process for a user in various service systems will be made public and fair.

DETAILED DESCRIPTION OF THE EMBODIMENTS

Figure 1:
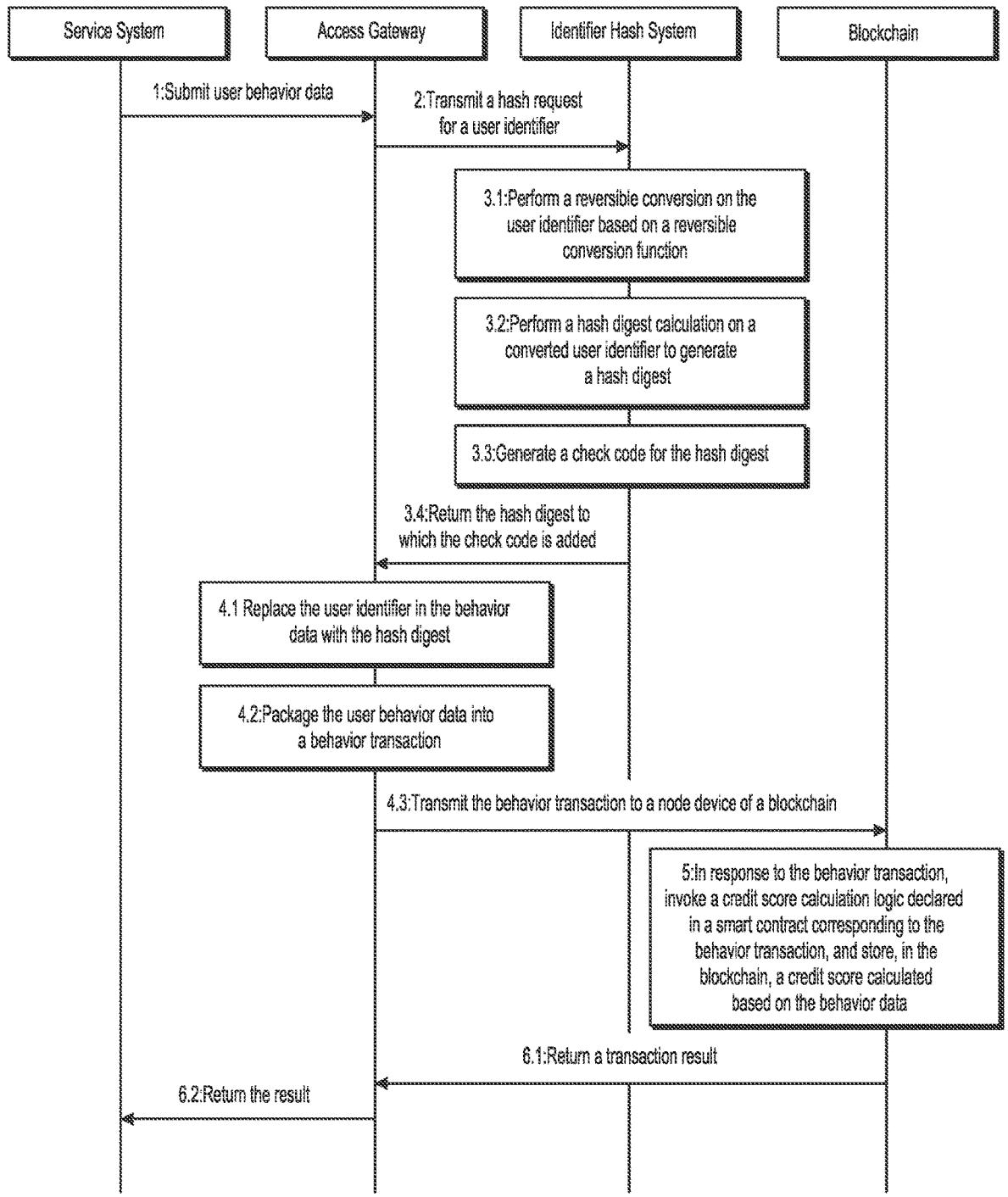
FIG. 1 is a schematic flowchart illustrating a blockchain-based credit recording method according to an embodiment of the present disclosure.

Examples will be described in detail herein, with the illustrations thereof represented in the drawings. When the following descriptions involve the drawings, like numerals in different drawings refer to like or similar elements unless otherwise indicated. The embodiments described in the following examples do not represent all embodiments consistent with the present disclosure. Rather, they are merely examples of apparatuses and methods consistent with some aspects of the present disclosure as detailed in the appended claims.

The terms used in the present disclosure are for the purpose of describing particular examples only, and are not intended to limit the present disclosure. Terms determined by "a", "the" and "said" in their singular forms in the present disclosure and the appended claims are also intended to include plurality, unless clearly indicated otherwise in the context. It should also be understood that the term "and/or" as used herein refers to and includes any and all possible combinations of one or more of the associated listed items.

It is to be understood that, although terms "first," "second," "third," and the like may be used in the present disclosure to describe various information, such information should not be limited to these terms. These terms are only used to distinguish one category of information from another. For example, without departing from the scope of the present disclosure, first information may be referred as second information. Similarly, second information may also be referred as first information. Depending on the context, the word "if" as used herein may be interpreted as "when" or "upon" or "in response to determining".

With the continuous development of social economy, recording the credit of individuals or enterprises has become more important. Especially with the vigorous development of sharing economy model, the sharing economy model imposes a test on users' credit. At present, users' credit system construction methods are mostly central privatization methods. Each enterprise usually establishes a set of credit systems separately for its own use. The collected data is, as a core asset, may not be disclosed to the public. Moreover, because user credit data cannot be shared, each enterprise may not recognize user credit provided by other third parties, which can exacerbate the motivation of the enterprise to establish its own credit system. In some cases, there exists a phenomenon of "reinventing the wheel", which leads to the waste of a large amount of resources. Since all credit evaluation systems are private, the credit evaluation process may have the problem of being not open and transparent.

Further, a user's credit evaluation is usually calculated based on the user's behavior data. The user's behavior data is a social attribute and should be shared as social resources to jointly promote social and economic development. However, another problem that the disclosure of user behavior data faces is user data privacy. If a user's credit needs to be disclosed, the user's behavior data will also need to be made public, but since the user's behavior data involves user privacy, the disclosure thereof may cause invasion and illegal use of the user privacy. Therefore, there is a need for an open and transparent credit recording solution, and it is also required to ensure the user privacy.

In some embodiments of the present disclosure, a blockchain-based credit recording solution is provided. For the credential storage transaction of the target user submitted by the target service system, the node device on the blockchain may invoke the calculation logic declared in the smart contract published by the target service system on the blockchain, calculate the credit score of the target user based on the behavior data, and store, as a credential, the credit score of the target user under the target service system. Correspondingly, in a credit querying solution, for the credit score querying request with respect to the target user submitted by any of service systems, the node device on the blockchain may invoke the calculation logic declared in the smart contract published on the blockchain, search for the credit scores of the target user in the respective service systems, and calculate the total credit score according to the credit scores of the target user in the respective service systems. In this way, based on the characteristics of blockchain that cannot be tampered with and is open and transparent, the credit evaluation process for a user in various service systems will be made public and fair. In addition, it is possible to hide the true identity of the user exposed in the user behavior data by way of converting the user identifier into the hash digest, thereby avoiding the leakage and invasion of user privacy data. Through the aggregated user credit data access mechanism, it is possible to accurately and comprehensively search for a user's credit score, thereby avoiding the leakage of the user's original behavior data and the guessing of his/her identity. Furthermore, the credit evaluation mechanism declared in the smart contract may be used to set weights for different service systems to incentivize entering service systems to improve data accuracy and cost-effectiveness (the higher the quality of data is provided, the higher the weight is set accordingly) and increase the data value of this blockchain-based credit system on the whole.

The blockchain described in this disclosure may include a private blockchain, a public blockchain, a consortium blockchain, etc., and is not particularly limited in the disclosure.

For example, in a scenario, the blockchain may be a consortium blockchain consisting of a platform party, an audit party, a notarial party, a publicity party, etc. as consortium members. The operator of the consortium blockchain may rely on the consortium blockchain to deploy corresponding services. The platform party, audit party, notarial party, publicity party, etc. as the consortium members described above may be used as a service node of the above-mentioned services. Each service node may publish service-related information generated by itself or received in form of transaction in the consortium blockchain, and after the transaction has been consensus-processed by consensus nodes on the consortium blockchain, the information is stored in a distributed database of the consortium blockchain to complete the "on-chain" credential storage of the transaction information.

It should be noted that the transaction described in this disclosure refers to data created by a client of the blockchain and published in the distributed database of the blockchain.

Transactions in the blockchain are usually divided into narrow transactions and broad transactions. The narrow transaction refers to a value transfer published by a user to the blockchain. For example, in a traditional Bitcoin blockchain network, transaction may be a bank transfer initiated by a user in the blockchain. The broad transaction refers to service data with a business intention published by a user to the blockchain. For example, the operator may build a consortium blockchain based on actual business needs and rely on the consortium blockchain to deploy some other types of online business that are not related to value transfer, such as a credential storage service, an anti-counterfeit verification service, etc. In this type of consortium blockchain, transaction may be a service message or service request with a business intention published by a user in the consortium blockchain.

The client may include any type of upper-layer applications that use underlying business data stored in the blockchain as data support to implement specific service functions.

In blockchain technology, nodes in the blockchain usually rely on corresponding smart contract to operate a block. For example, operations such as storage, modification, and deletion in the blockchain may rely on a smart contract. The smart contract may be a computer protocol intended to be deployed on a blockchain and applied to propagate, verify or execute the contract in a digital manner. By declaring a service logic in a smart contract, corresponding operation may be performed. The smart contract allows trusted transactions without a third party. These transactions are traceable and irreversible. Smart contracts may provide security superior to traditional contract methods and reduce other transaction costs associated with the contracts. Generally, a smart contract may be deployed locally on a blockchain node. When a node needs to perform an action, corresponding smart contract may be invoked. The smart contract is operated to execute the service logic declared in the smart contract to get an execution result.

The platform party may perform system maintenance and data calculation. The audit party may be responsible for qualification examination and recording of entering service systems and reviewing of smart contracts. The notarial party may be responsible for notarization and storage of data. The publicity party may be responsible for announcement of smart contracts, credit data, etc. In the early days of consortium, nodes from other platform parties may also participate and be responsible for data calculation and persistence, etc.

The process of a service party entering a blockchain will be described below.

The service party transmits an entering application transaction to a platform party and submits qualification-related information.

The platform party packages the qualification-related information into a transaction and transmits the transaction to the blockchain to apply for entering.

The blockchain executes a smart contract for the entering application and notifies audit parties of performing entering examination.

The audit parties transmit audit results to the blockchain, and the blockchain executes the smart contract for the entering application, and summarizes the audit results.

The blockchain notifies the platform party of the summarized audit result, and the platform party notifies the service party of the result.

So far, the process of the service party entering the blockchain ends.

After passing through the examination, the service party may create a smart contract for credit calculation (hereinafter referred to as a credit contract) that conforms to its own business scenario according to the smart contract standard, and transmit a credit contract creation application.

The platform party packages an application transaction of the credit contract and transmits the packaged application transaction to the blockchain.

The blockchain notifies the audit parties and the platform party of performing contract examination.

The blockchain summarizes audit results and notifies the platform party and the publicity party of the summarized audit result.

After the platform party receives the summarized audit result, if passing through the examination, it will transmit a smart contract creation transaction to create corresponding smart contract.

The blockchain will calculate credit contract digests, and verify whether the contract has been approved and is valid. After passing through the verification, it will be created.

After the credit contract is successfully created, it will be publicized by the publicity party.

So far, the creation of the credit contract is completed.

In some embodiments of this disclosure, the service systems are provided with a channel for chaining smart contracts for credit calculation that conform to their own business scenarios. For the overall technical solution, through different credit contracts, user credit data may be created multi-dimensionally and comprehensively to improve credit accuracy and data value.

FIG. 1 is a flowchart illustrating a blockchain-based credit recording method. The method may be applied to a system architecture including a service system, a blockchain, an access gateway, and an identifier hash system.

In this example, in order to meet the on-chain credential storage requirements of multiple service systems, an access gateway may be provided to uniformly deploy the credential storage requests of the service systems. The access gateway may interface with a plurality of different service systems and is associated with a blockchain. The access gateway may be a node device on the blockchain. Each service system may implement a user's credit record by following steps below.

1. A service system submits behavior data of a user to an access gateway.

The behavior data includes a user identifier of the user.

2. The access gateway transmits a hash request for the user identifier to an identifier hash system.

3.1. The identifier hash system, in response to the hash request, performs a reversible conversion on the user identifier based on a reversible conversion function 3.4. A hash digest calculation is performed on a converted user identifier to generate a hash digest.

3.3. A check code is generated for the hash digest.

The identifier hash system generates the check code for the generated hash digest to prevent the hash digest from being tampered with.

3.4. The hash digest to which the check code is added is returned to the access gateway.

4.1. The access gateway replaces the user identifier in the user behavior data with the hash digest.

Here, the access gateway hides the true identity of the user exposed in the user behavior data by way of converting the user identifier into the hash digest, thereby avoiding the leakage and invasion of user privacy data.

4.2. The user behavior data is packaged into a behavior transaction.

4.3. The behavior transaction is transmitted to a node device on a blockchain.

5. The node device, in response to the behavior transaction, invokes a credit score calculation logic declared in a smart contract corresponding to the behavior transaction, and stores, in the blockchain, a credit score calculated based on the user behavior data.

Here, the smart contract on the blockchain is used to evaluate user credit based on the user behavior data, which makes the evaluation process public and fair.

6.1. The node device returns a transaction result to the access gateway.

6.2. The access gateway provides the transaction result returned by the node device to the service system.

In this way, a service system completes a user's credit recording process.

Figure 2:
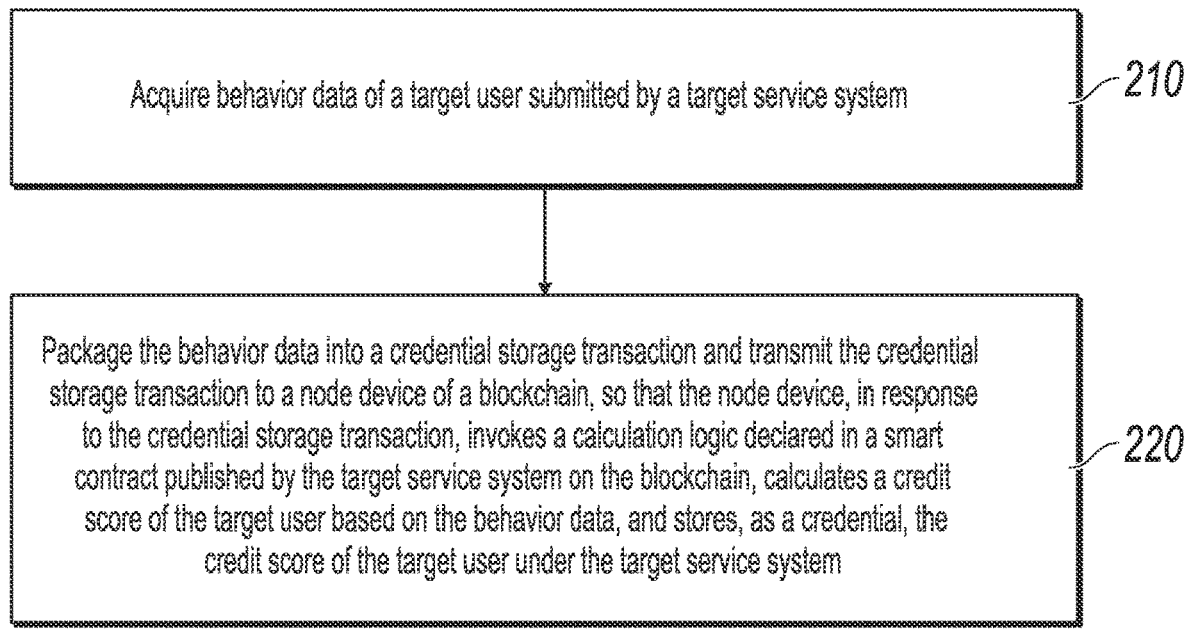
FIG. 2 is an example of a method in which a service system is taken as an entity, corresponding to that shown in FIG. 1.

Referring to FIG. 2, an example of a method in which an access gateway is taken as an entity in the present disclosure will be described below. This example may correspond to that in FIG. 1. The method includes:

At step 210, behavior data of a target user submitted by a target service system is acquired.

At step 220, the behavior data is packaged into a credential storage transaction and the credential storage transaction is transmitted to a node device on a blockchain. The node device, in response to the credential storage transaction, invokes a calculation logic declared in a smart contract published by the target service system on the blockchain, calculates a credit score of the target user based on the behavior data, and stores, as a credential, the credit score of the target user under the target service system.

In an example, the behavior data includes a user identifier of the target user. In this example, before packaging the behavior data into the credential storage transaction and transmitting the credential storage transaction to the node device on the blockchain, the method further includes: generating a corresponding hash digest according to the user identifier. Packaging the behavior data into the credential storage transaction and transmitting the credential storage transaction to the node device on the blockchain includes: replacing the user identifier in the behavior data with the hash digest, and packaging the behavior data into the credential storage transaction and transmitting the credential storage transaction to the node device on the blockchain.

In an example, generating the corresponding hash digest according to the user identifier includes: transmitting a hash request for the user identifier to an identifier hash system, so that the identifier hash system performs a hash digest calculation on the user identifier to generate a hash digest.

In an example, performing the hash digest calculation on the user identifier to generate the hash digest includes: performing a reversible conversion on the user identifier based on a reversible conversion function; and performing the hash digest calculation on a converted user identifier to generate the hash digest.

In an example, a check code is added to the hash digest.

Figure 3:
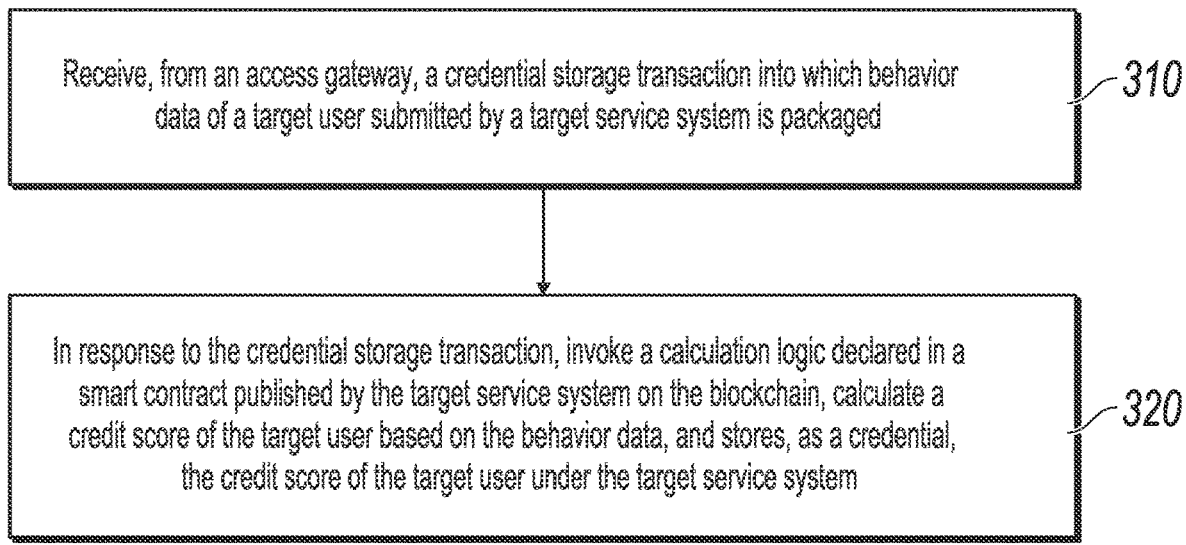
FIG. 3 is an example of a method in which a node device on a blockchain is taken as an entity, corresponding to that shown in FIG. 1.

Referring to FIG. 3, an example of a method in which a node device on a blockchain is taken as an entity in the present disclosure will be described below. This example may correspond to that in FIG. 1. The method includes:

At step 310, a credential storage transaction into which behavior data of a target user submitted by a target service system is packaged is received from an access gateway.

At step 320, in response to the credential storage transaction, a calculation logic declared in a smart contract published by the target service system on the blockchain is invoked, a credit score of the target user is calculated based on the behavior data, and the credit score of the target user under the target service system is stored as a credential.

In an example, the behavior data includes a hash digest. The hash digest is generated by performing a hash digest calculation on a user identifier of the target user.

In an example, performing the hash digest calculation on the user identifier of the target user includes: performing a reversible conversion on the user identifier based on a reversible conversion function; and performing the hash digest calculation on a converted user identifier to generate the hash digest.

In an example, the hash digest is further added with a check code.

In summary, some embodiments of the present disclosure provide a blockchain-based credit recording solution. For the credential storage transaction of the target user submitted by the target service system, the node device on the blockchain may invoke the calculation logic declared in the smart contract published by the target service system on the blockchain, calculate the credit score of the target user based on the behavior data, and store, as a credential, the credit score of the target user under the target service system.

In this way, based on the characteristics of blockchain that cannot be tampered with and is open and transparent, the credit evaluation process for a user in various service systems will be made public and fair. In addition, it is possible to hide the true identity of the user exposed in the user behavior data by way of converting the user identifier into the hash digest, thereby avoiding the leakage and invasion of user privacy data.

Figure 4:
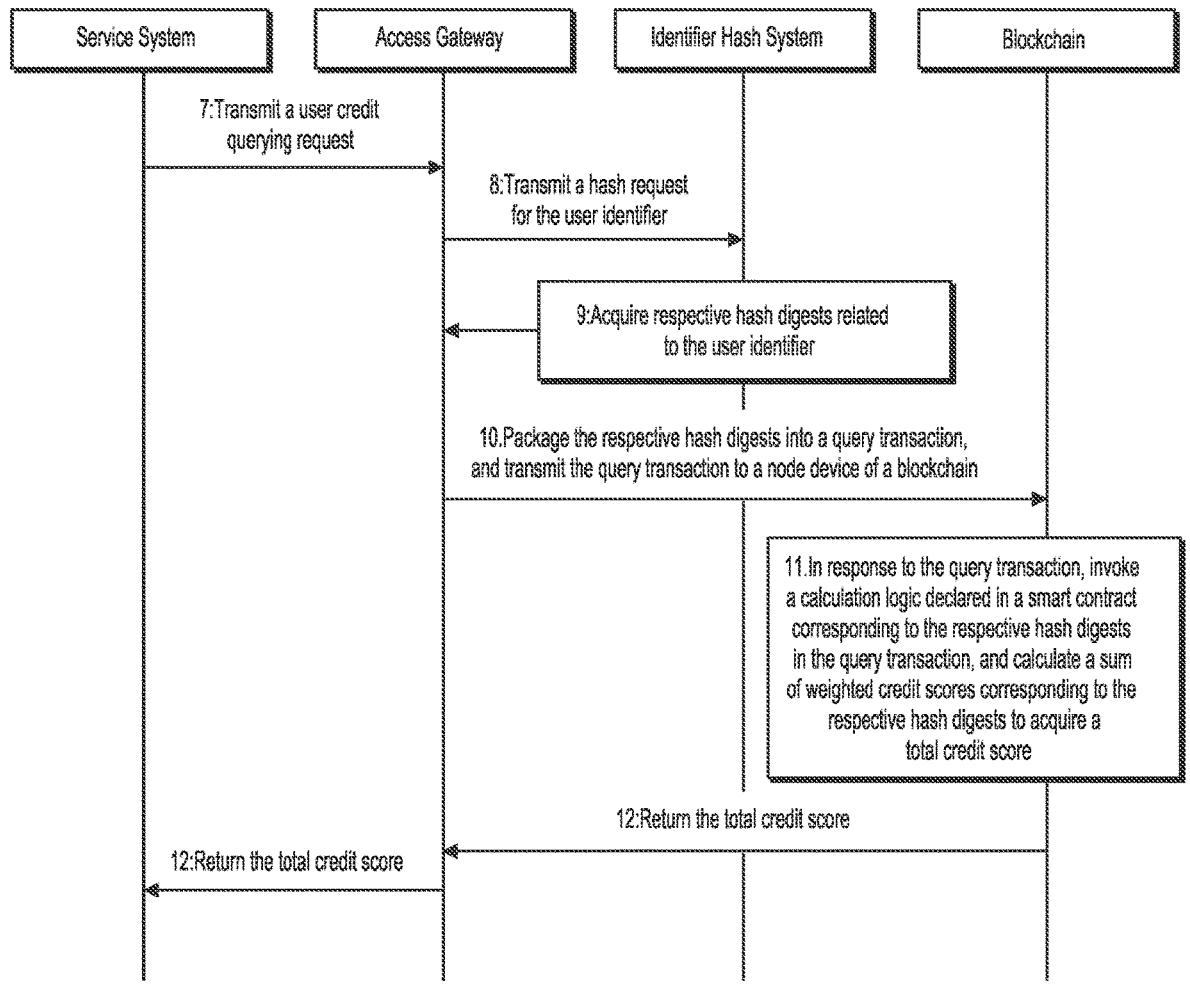
FIG. 4 is a schematic flowchart illustrating a blockchain-based credit querying method according to an embodiment of the present disclosure.

FIG. 4 is a flowchart illustrating a blockchain-based credit querying method. The method may be applied to a system architecture including a service system, a blockchain, an access gateway, and an identifier hash system. This method may be performed after the credit record shown in FIG. 1.

In this example, in order to meet the on-chain credential storage requirements of multiple service systems, an access gateway may be provided to uniformly deploy the credential storage requests of the service systems. The access gateway may interface with a plurality of different service systems and is associated with a blockchain. The access gateway may be a node device on the blockchain. Each service system may implement a user's credit record by following steps below.

7. A service system transmits a user credit querying request to an access gateway.

Any of service systems, when needing to acquire the credit information of a target user, may transmit a target user credit querying request to the access gateway. The request includes a user identifier of the target user.

8. The access gateway transmits a hash request for the user identifier to an identifier hash system.

Because the target user may correspondingly have multiple credit scores in different service systems, respective hash digests related to the target user may be acquired from the identifier hash system.

9. The identifier hash system, in response to the hash request, acquires respective hash digests related to the user identifier.

10. The access gateway packages the respective hash digests into a query transaction, and transmits the query transaction to a node device on a blockchain.

11. The node device, in response to the query transaction, invokes a calculation logic declared in a smart contract corresponding to the respective hash digests in the query transaction, and calculates a sum of weighted credit scores corresponding to the respective hash digests to acquire a total credit score.

12. The total credit score is returned to the node device, so that the node device returns the total credit score to the service system.

Figure 5:
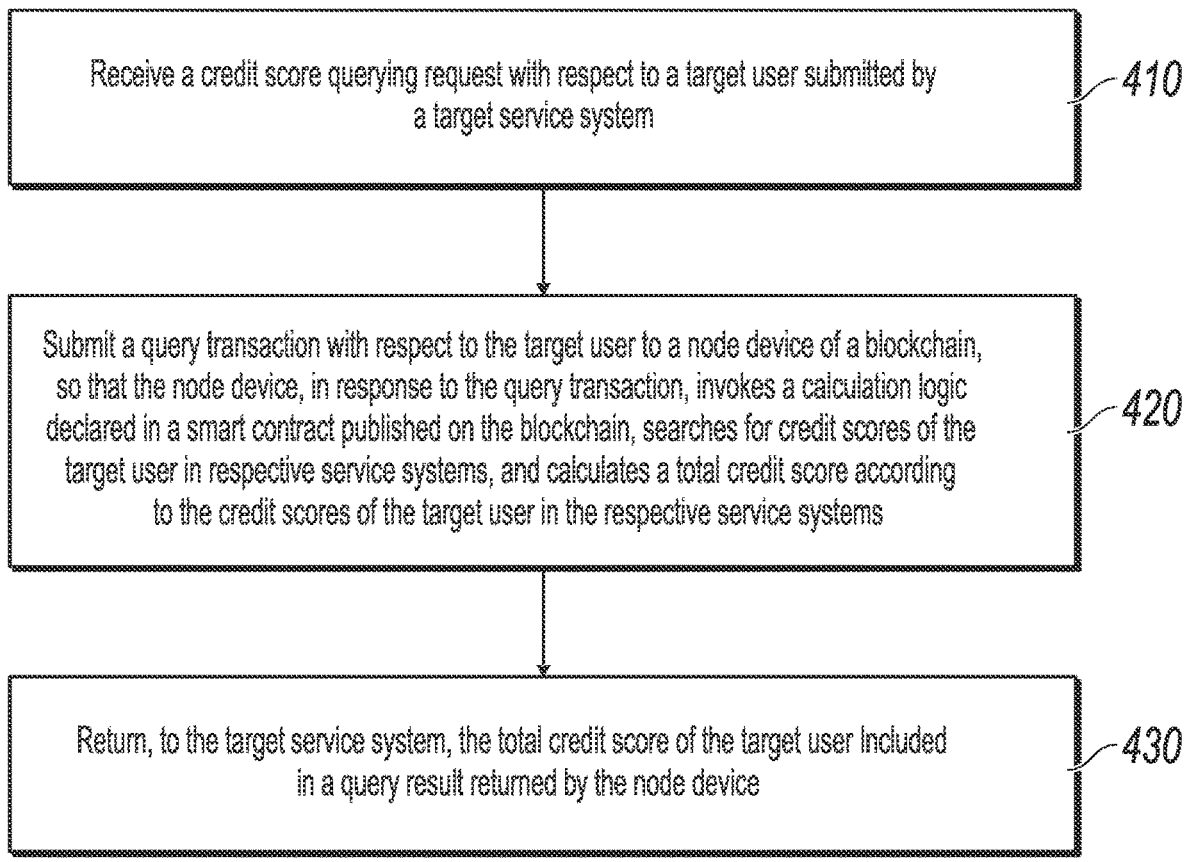
FIG. 5 is an example of a method in which a service system is taken as an entity, corresponding to that shown in FIG. 4.

Referring to FIG. 5, an example of a method in which an access gateway is taken as an entity in the present disclosure will be described below. This example may correspond to that in FIG. 4. The method includes:

At step 410, a credit score querying request with respect to a target user submitted by a target service system is received.

At step 420, a query transaction with respect to the target user is submitted to a node device on a blockchain. The node device, in response to the query transaction, invokes a calculation logic declared in a smart contract published on the blockchain, searches for credit scores of the target user in respective service systems, and calculates a total credit score according to the credit scores of the target user in the respective service systems.

At step 430, the total credit score of the target user included in a query result returned by the node device is returned to the target service system.

In an example, the credit score querying request includes a user identifier of the target user. In this example, before submitting the query transaction with respect to the target user to the node device on the blockchain, the method further includes: acquiring respective hash digests related to the user identifier. Submitting the query transaction with respect to the target user to the node device on the blockchain includes: packaging the respective hash digests into the query transaction and submitting the query transaction to the node device on the blockchain. Querying the credit scores of the target user in the respective service systems includes: searching for credit scores corresponding to the respective hash digests in the blockchain.

In an example, calculating the total credit score according to the credit scores of the target user in the respective service systems includes: calculating a sum of the weighted credit scores of the target user in the respective service systems according to weights of the respective service systems to calculate a weighted total credit score.

Figure 6:
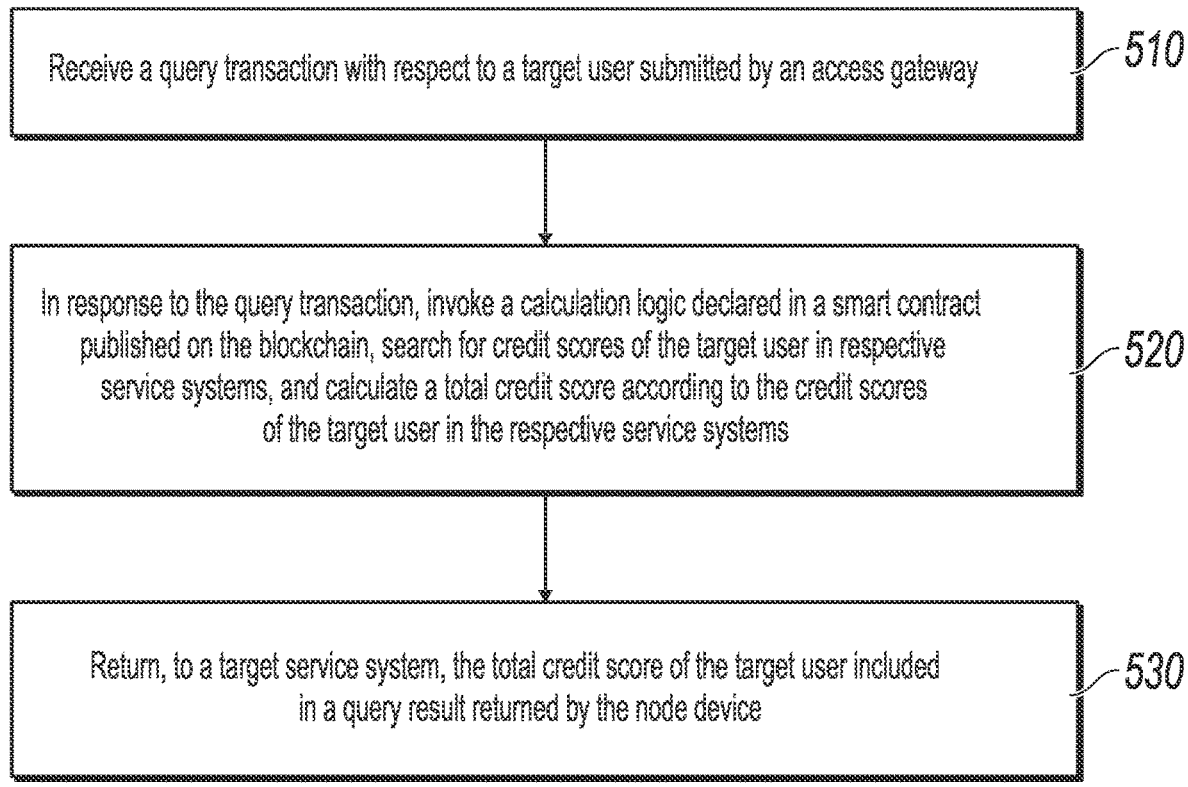
FIG. 6 is an example of a method in which a node device on a blockchain is taken as an entity, corresponding to that shown in FIG. 4.

Referring to FIG. 6, an example of a method in which a node device on a blockchain is taken as an entity in the present disclosure will be described below. This example may correspond to that in FIG. 4. The method includes:

At step 510, a query transaction with respect to a target user submitted by an access gateway is received.

At step 520, in response to the query transaction, a calculation logic declared in a smart contract published on the blockchain is invoked, credit scores of the target user in respective service systems is searched for, and a total credit score is calculated according to the credit scores of the target user in the respective service systems.

At step 530, the total credit score of the target user included in a query result returned by the node device is returned to a target service system.

In an example, the query transaction includes a hash digest. In this example, the hash digest is a hash value acquired by performing a hash calculation on a user identifier of the target user. Querying the credit scores of the target user in the respective service systems includes: searching for credit scores corresponding to respective hash digests in the blockchain.

In an example, calculating the total credit score according to the credit scores of the target user in the respective service systems includes: calculating a sum of the weighted credit scores of the target user in the respective service systems according to weights of the respective service systems to calculate a weighted total credit score.

In summary, some embodiments of the present disclosure provide a blockchain-based credit querying solution. For the credit score querying request with respect to the target user submitted by any of service systems, the node device on the blockchain may invoke the calculation logic declared in the smart contract published on the blockchain, search for the credit scores of the target user in the respective service systems, and calculate the total credit score according to the credit scores of the target user in the respective service systems. In this way, through the aggregated user credit data access mechanism, it is possible to accurately and comprehensively query a user's credit score, thereby avoiding the leakage of the user's original behavior data and the guessing of user's identity. Furthermore, the credit evaluation mechanism declared in the smart contract may be used to set weights for different service systems to incentivize entering service systems to improve data accuracy and cost-effectiveness (the higher the quality of data is provided, the higher the weight is set accordingly) and increase the data value of this blockchain-based credit system on the whole.

Corresponding to the examples of the blockchain-based credit recording and querying methods, this disclosure also provides examples of blockchain-based credit recording and querying apparatuses. The apparatus examples may be implemented by software or by hardware or by a combination of software and hardware. Taking software implementation as an example, as a logical apparatus, it is formed by a processor of a device, where it is located, reading corresponding computer business program instructions in a non-volatile memory into a memory for execution. In terms of hardware, in addition to a processor, a network interface, a memory, and a non-volatile memory, the device where the apparatus is located in the examples may usually further include other hardware according to the actual function of the blockchain-based credit record and query, which will not be described herein again.

Figure 7:
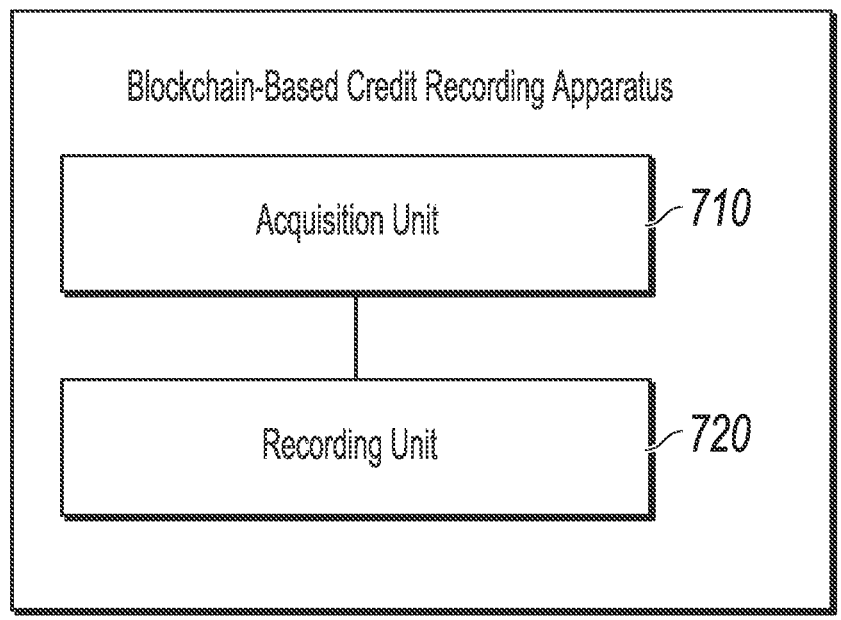
FIG. 7 is a schematic modular diagram illustrating a blockchain-based credit recording apparatus according to an embodiment of the present disclosure.

FIG. 7 is a modular diagram illustrating a blockchain-based credit recording apparatus according to an embodiment of the present disclosure. The apparatus corresponds to the example shown in FIG. 2. The apparatus includes: an acquisition unit 710 configured to acquire behavior data of a target user submitted by a target service system; and a recording unit 720 configured to package the behavior data into a credential storage transaction and transmit the credential storage transaction to a node device on a blockchain. The node device, in response to the credential storage transaction, invokes a calculation logic declared in a smart contract published by the target service system on the blockchain, calculates a credit score of the target user based on the behavior data, and stores, as a credential, the credit score of the target user under the target service system.

In some embodiments, the behavior data includes a user identifier of the target user.

The recording unit 720 includes: a generation subunit configured to generate a corresponding hash digest according to the user identifier; and a transmission subunit configured to replace the user identifier in the behavior data with the hash digest, and package the behavior data into the credential storage transaction and transmit the credential storage transaction to the node device on the blockchain.

In some embodiments, the generation subunit is configured to: transmit a hash request for the user identifier to an identifier hash system, so that the identifier hash system performs a hash digest calculation on the user identifier to generate a hash digest.

In some embodiments, performing the hash digest calculation on the user identifier to generate the hash digest includes: performing a reversible conversion on the user identifier based on a reversible conversion function; and performing the hash digest calculation on a converted user identifier to generate the hash digest.

In some embodiments, a check code is added to the hash digest.

Figure 8:
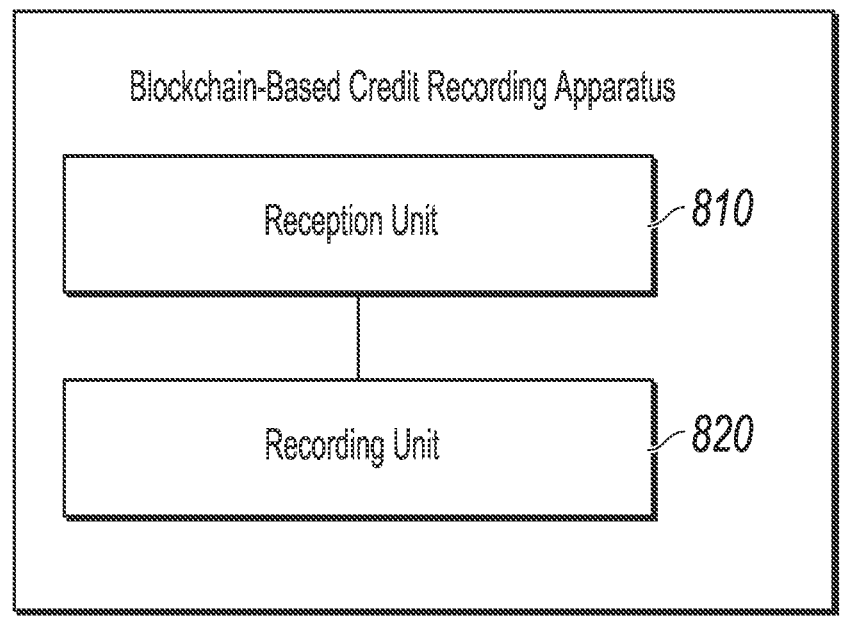
FIG. 8 is a schematic modular diagram illustrating a blockchain-based credit recording apparatus according to an embodiment of the present disclosure.

FIG. 8 is a modular diagram illustrating a blockchain-based credit recording apparatus according to an embodiment of the present disclosure. The apparatus corresponds to the example shown in FIG. 3. The apparatus includes: a reception unit 810 configured to receive, from an access gateway, a credential storage transaction into which behavior data of a target user submitted by a target service system is packaged; and a recording unit 820 configured to, in response to the credential storage transaction, invoke a calculation logic declared in a smart contract published by the target service system on the blockchain, calculate a credit score of the target user based on the behavior data, and store, as a credential the credit, score of the target user under the target service system.

In some embodiments, the behavior data includes a hash digest.

The hash digest is generated by performing a hash digest calculation on a user identifier of the target user.

In some embodiments, performing the hash digest calculation on the user identifier of the target user includes: performing a reversible conversion on the user identifier based on a reversible conversion function; and performing the hash digest calculation on a converted user identifier to generate the hash digest.

In some embodiments, the hash digest is further added with a check code.

Figure 9:
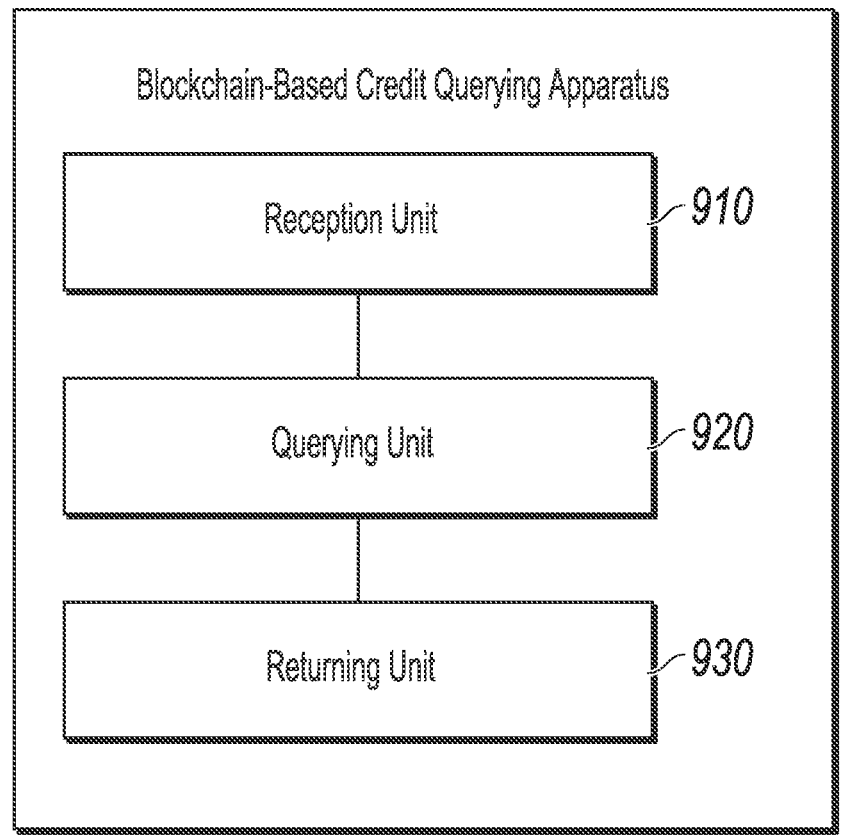
FIG. 9 is a schematic modular diagram illustrating a blockchain-based credit querying apparatus according to an embodiment of the present disclosure.

FIG. 9 is a modular diagram illustrating a blockchain-based credit querying apparatus according to an embodiment of the present disclosure. The apparatus corresponds to the example shown in FIG. 5. The apparatus includes: a reception unit 910 configured to receive a credit score querying request with respect to a target user submitted by a target service system; a querying unit 920 configured to submit a query transaction with respect to the target user to a node device on a blockchain, so that the node device, in response to the query transaction, invokes a calculation logic declared in a smart contract published on the blockchain, searches for credit scores of the target user in respective service systems, and calculates a total credit score according to the credit scores of the target user in the respective service systems; and a returning unit 930 configured to return, to the target service system, the total credit score of the target user included in a query result returned by the node device.

In some embodiments, the credit score querying request includes a user identifier of the target user.

Before the querying unit 920, the apparatus further includes: an acquisition subunit configured to acquire respective hash digests related to the user identifier.

Submitting, by the querying unit 920, the query transaction with respect to the target user to the node device on the blockchain includes: packaging the respective hash digests into the query transaction and submitting the query transaction to the node device on the blockchain.

Querying the credit scores of the target user in the respective service systems includes: searching for credit scores corresponding to the respective hash digests in the blockchain.

In some embodiments, calculating the total credit score according to the credit scores of the target user in the respective service systems includes: calculating a sum of the weighted credit scores of the target user in the respective service systems according to weights of the respective service systems to calculate a weighted total credit score.

Figure 10:
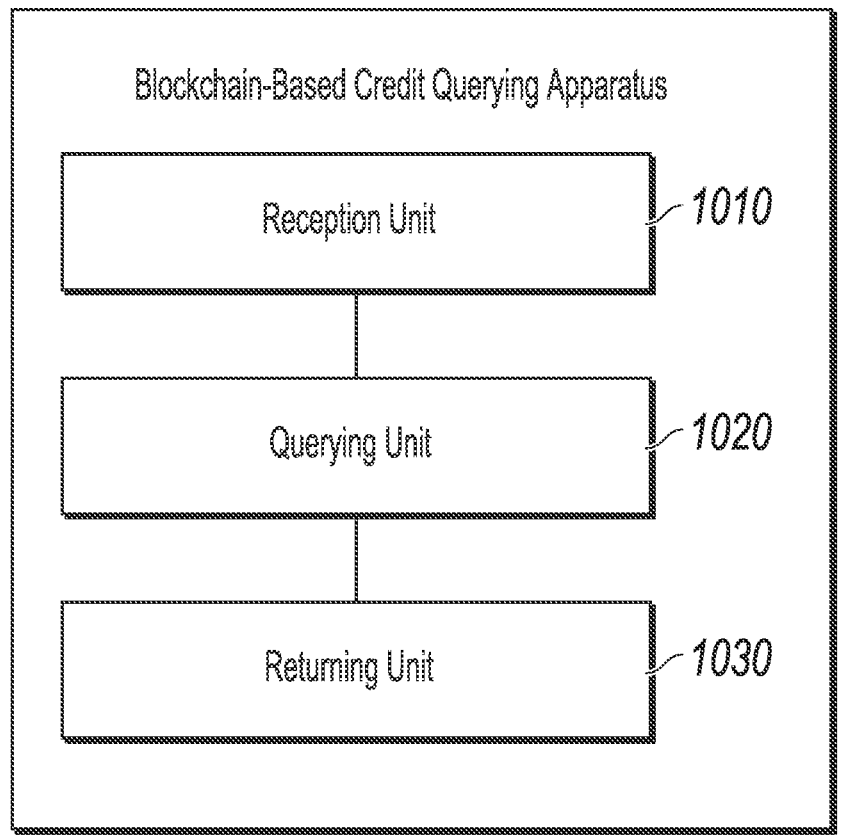
FIG. 10 is a schematic modular diagram illustrating a blockchain-based credit querying apparatus according to an embodiment of the present disclosure.

FIG. 10 is a modular diagram illustrating a blockchain-based credit querying apparatus according to an embodiment of the present disclosure. The apparatus corresponds to the example shown in FIG. 6. The apparatus includes: a reception unit 1010 configured to receive a query transaction with respect to a target user submitted by an access gateway; a querying unit 1020 configured to, in response to the query transaction, invoke a calculation logic declared in a smart contract published on the blockchain, search for credit scores of the target user in respective service systems, and calculate a total credit score according to the credit scores of the target user in the respective service systems; and a returning unit 1030 configured to return, to a target service system, the total credit score of the target user included in a query result returned by the node device.

In some embodiments, the query transaction includes a hash digest.

The hash digest is a hash value acquired by performing a hash calculation on a user identifier of the target user.

Querying the credit scores of the target user in the respective service systems includes: searching for credit scores corresponding to respective hash digests in the blockchain.

In some embodiments, calculating the total credit score according to the credit scores of the target user in the respective service systems includes: calculating a sum of the weighted credit scores of the target user in the respective service systems according to weights of the respective service systems to calculate a weighted total credit score.

The system, apparatus, module, or unit illustrated in the above examples may be implemented by using a computer chip or an entity, or by using a product having a certain function. An implementation device can be a computer, and the form of the computer may be a personal computer, a laptop computer, a cellular phone, a camera phone, a smartphone, a personal digital assistant, a media player, a navigation device, an email receiving and sending device, a game console, a tablet computer, a wearable device, or any combination of these devices.

For details about the implementation process of functions and roles of units in the above apparatuses, reference may be made to the implementation process of corresponding steps in the above methods, which will not be described herein again.

For the apparatus examples, since they basically correspond to the method examples, reference may be made to the partial description of the method examples. The apparatus examples described above are merely illustrative, wherein the units described as separate components may or may not be physically separated, and the components displayed as units may or may not be physical units, i.e., may be located in one place or may be distributed to multiple network units. Some or all of the modules may be selected according to actual needs to achieve the objectives of solutions in the present disclosure. Those of ordinary skill in the art can understand and implement the present disclosure without any creative effort.

The above figures describe the internal functional modules and structure of a blockchain-based credit recording or querying apparatus, and its actual execution subject may be an electronic device, including: a processor; and a memory for storing processor executable instructions, wherein the processor is configured to: implement any of the blockchain-based credit recording or querying methods described above.

In examples of the electronic device, it should be understood that the processor may be a Central Processing Unit (CPU), or other general-purpose processor, a Digital Signal Processor (DSP), an Application Specific Integrated Circuit (ASIC), etc. The general-purpose processor may be a microprocessor or the processor may be any conventional processor and the like. The aforementioned memory may be a read-only memory (ROM), a Random access memory (RAM), a flash memory, a hard disk, or a solid state disk. The steps of the method disclosed in combination with the examples of the present disclosure may be directly performed by a hardware processor, or may be performed by a combination of hardware and software modules in a processor.

The examples in this disclosure are described in a progressive manner, and the same or similar parts between the examples may refer to each other. Each example focuses on differences from other examples. In particular, with respect to the examples of the electronic device, since they are basically similar to the method examples, the description thereof is relatively simple. For the related parts, reference may be made to the description of the method examples.

Other embodiments of the present disclosure will be readily apparent to those skilled in the art after considering the disclosure and practicing the methods as disclosed herein. The present disclosure is intended to cover any variations, uses, or adaptations of the present disclosure, which follow the general principle of the present disclosure and include common knowledge or conventional technical means in the art that are not disclosed in the present disclosure. The disclosure and examples are to be regarded as illustrative only. The true scope and spirit of the present disclosure are pointed out by the following claims.

It is to be understood that the present disclosure is not limited to the precise structures that have described and shown in the drawings, and various modifications and changes can be made without departing from the scope thereof. The scope of the disclosure is to be limited only by the appended claims.

What is claimed is:

1. A computer-implemented method, comprising:
   receiving, by an access gateway, a user data query that comprises a user identifier;
   transmitting, by the access gateway and to an identifier hash system, a hash request for the user identifier under respective different service systems;
   receiving, by the access gateway and from the identifier hash system, a plurality of hash digests of the user identifier under the respective different service systems, wherein the plurality of hash digests comprises, for each service system of the respective different service systems, a respective hash digest of the user identifier under the service system;
   packaging, by the access gateway, the plurality of hash digests of the user identifier under the respective different service systems into a user data query transaction;
   transmitting, by the access gateway and to a blockchain, the user data query transaction;
   receiving, by the access gateway and from the blockchain, an aggregated user score based on a plurality of user scores, wherein the aggregated user score is determined based on a calculation smart contract published on the blockchain, the calculation smart contract configured to perform operations comprising:
      for each respective hash digest of the plurality of hash digests of the user identifier under the respective different service systems, searching the blockchain for respective user scores for a user; and
      aggregating the respective user scores to determine the aggregated user score, while preventing disclosure of the user identifier under the respective different service systems; and
   providing, by the access gateway, the aggregated user score.

2. The computer-implemented method of claim 1, further comprising:
   receiving, by the access gateway and from a given service system, user data including a given user identifier under the given service system;
   transmitting, by the access gateway and to the blockchain, a storage transaction that includes the user data;
   receiving, by the access gateway and from the blockchain, a result of the storage transaction having been executed by a storage smart contract on the blockchain; and
   providing, by the access gateway and to the given service system, the result of the storage transaction.

3. The computer-implemented method of claim 2, wherein the storage smart contract is configured to perform operations comprising:
   in response to receiving the storage transaction, invoking a calculation logic declared in the storage smart contract;
   calculating a score for the user based on the user data; and
   storing the score for the user under the service system.

4. The computer-implemented method of claim 1, wherein searching the blockchain for respective user scores for the user comprises searching the blockchain for user scores corresponding to each of the plurality of hash digests of the user identifier under the respective different service systems.

5. The computer-implemented method of claim 1, wherein aggregating the respective user scores comprises aggregating weighted user scores of the user, wherein the weighted user scores of the user have been set according to weights of the respective different service systems.

6. The computer-implemented method of claim 1, wherein the identifier hash system is configured to perform operations comprising:
   performing hash digest calculations on the user identifier under the respective different service systems, to generate the plurality of hash digests of the user identifier.

7. The computer-implemented method of claim 6, wherein performing the hash digest calculations on the user identifier under the respective different service systems comprises:
   for each user identifier, (i) performing a reversible conversion on the user identifier based on a reversible conversion function, and (ii) performing a hash digest calculation on a converted user identifier to generate a hash digest of the user identifier.

8. A non-transitory, computer-readable medium storing one or more instructions executable by a computer system to perform operations comprising:
   receiving, by an access gateway, a user data query that comprises a user identifier;
   transmitting, by the access gateway and to an identifier hash system, a hash request for the user identifier under respective different service systems;
   receiving, by the access gateway and from the identifier hash system, a plurality of hash digests of the user identifier under the respective different service systems, wherein the plurality of hash digests comprises, for each service system of the respective different service systems, a respective hash digest of the user identifier under the service system;
   packaging, by the access gateway, the plurality of hash digests of the user identifier under the respective different service systems into a user data query transaction;

transmitting, by the access gateway and to a blockchain, the user data query transaction;

receiving, by the access gateway and from the blockchain, an aggregated user score based on a plurality of user scores, wherein the aggregated user score is determined based on a calculation smart contract published on the blockchain, the calculation smart contract configured to perform operations comprising:

for each respective hash digest of the plurality of hash digests of the user identifier under the respective different service systems, searching the blockchain for respective user scores for a user; and aggregating the respective user scores to determine the aggregated user score, while preventing disclosure of the user identifier under the respective different service systems; and providing, by the access gateway, the aggregated user score.

9. The computer-readable medium of claim 8, the operations further comprising:

receiving, by the access gateway and from a given service system, user data including a given user identifier under the given service system;

transmitting, by the access gateway and to the blockchain, a storage transaction that includes the user data;

receiving, by the access gateway and from the blockchain, a result of the storage transaction having been executed by a storage smart contract on the blockchain; and providing, by the access gateway and to the given service system, the result of the storage transaction.

10. The computer-readable medium of claim 9, wherein the storage smart contract is configured to perform operations comprising:

in response to receiving the storage transaction, invoking a calculation logic declared in the storage smart contract;

calculating a score for the user based on the user data; and storing the score for the user under the service system.

11. The computer-readable medium of claim 8, wherein searching the blockchain for respective user scores for the user comprises searching the blockchain for user scores corresponding to each of the plurality of hash digests of the user identifier under the respective different service systems.

12. The computer-readable medium of claim 8, wherein aggregating the respective user scores comprises aggregating weighted user scores of the user, wherein the weighted user scores of the user have been set according to weights of the respective different service systems.

13. The computer-readable medium of claim 8, wherein the identifier hash system is configured to perform operations comprising:

performing hash digest calculations on the user identifier under the respective different service systems, to generate the plurality of hash digests of the user identifier, wherein performing the hash digest calculations comprises, for each user identifier, (i) performing a reversible conversion on the user identifier based on a reversible conversion function, and (ii) performing a hash digest calculation on a converted user identifier to generate a hash digest of the user identifier.

14. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:

receiving, by an access gateway, a user data query that comprises a user identifier;

transmitting, by the access gateway and to an identifier hash system, a hash request for the user identifier under respective different service systems;

receiving, by the access gateway and from the identifier hash system, a plurality of hash digests of the user identifier under the respective different service systems, wherein the plurality of hash digests comprises, for each service system of the respective different service systems, a respective hash digest of the user identifier under the service system;

packaging, by the access gateway, the plurality of hash digests of the user identifier under the respective different service systems into a user data query transaction;

transmitting, by the access gateway and to a blockchain, the user data query transaction;

receiving, by the access gateway and from the blockchain, an aggregated user score based on a plurality of user scores, wherein the aggregated user score is determined based on a calculation smart contract published on the blockchain, the calculation smart contract configured to perform operations comprising:

for each respective hash digest of the plurality of hash digests of the user identifier under the respective different service systems, searching the blockchain for respective user scores for a user; and aggregating the respective user scores to determine the aggregated user score, while preventing disclosure of the user identifier under the respective different service systems; and providing, by the access gateway, the aggregated user score.

15. The computer-implemented system of claim 14, the operations further comprising:

receiving, by the access gateway and from a given service system, user data including a given user identifier under the given service system;

transmitting, by the access gateway and to the blockchain, a storage transaction that includes the user data;

receiving, by the access gateway and from the blockchain, a result of the storage transaction having been executed by a storage smart contract on the blockchain; and providing, by the access gateway and to the given service system, the result of the storage transaction.

16. The computer-implemented system of claim 15, wherein the storage smart contract is configured to perform operations comprising:

in response to receiving the storage transaction, invoking a calculation logic declared in the storage smart contract;

calculating a score for the user based on the user data; and storing the score for the user under the service system.

17. The computer-implemented system of claim 14, wherein searching the blockchain for respective user scores for the user comprises searching the blockchain for user scores corresponding to each of the plurality of hash digests of the user identifier under the respective different service systems.

18. The computer-implemented system of claim 14, wherein aggregating the respective user scores comprises aggregating weighted user scores of the user, wherein the weighted user scores of the user have been set according to weights of the respective different service systems.

19. The computer-implemented system of claim 14, wherein the identifier hash system is configured to perform operations comprising:
   performing hash digest calculations on the user identifier under the respective different service systems, to generate the plurality of hash digests of the user identifier.

20. The computer-implemented system of claim 19, wherein performing the hash digest calculations on the user identifier under the respective different service systems comprises:
   for each user identifier, (i) performing a reversible conversion on the user identifier based on a reversible conversion function, and (ii) performing a hash digest calculation on a converted user identifier to generate a hash digest of the user identifier.

* * * * *